US008320682B2

(12) United States Patent
Froeba et al.

(10) Patent No.: US 8,320,682 B2
(45) Date of Patent: Nov. 27, 2012

(54) EVALUATION OF EDGE DIRECTION INFORMATION

(75) Inventors: Bernhard Froeba, Steinbach (DE); Christian Kueblbeck, Erlangen (DE)

(73) Assignee: Fraunhofer-Gesellschaft zur Foerderung der angewandten Forschung e.V., Muenchen (DE)

( * ) Notice: Subject to any disclaimer, the term of this patent is extended or adjusted under 35 U.S.C. 154(b) by 1600 days.

(21) Appl. No.: 10/363,339

(22) PCT Filed: Sep. 3, 2001

(86) PCT No.: PCT/DE01/03375
§ 371 (c)(1),
(2), (4) Date: Aug. 13, 2003

(87) PCT Pub. No.: WO02/21427
PCT Pub. Date: Mar. 14, 2002

(65) Prior Publication Data
US 2005/0036688 A1    Feb. 17, 2005

(30) Foreign Application Priority Data
Sep. 4, 2000   (DE) .................................. 100 43 460

(51) Int. Cl.
*G06K 9/62* (2006.01)
(52) U.S. Cl. ....................................... 382/216; 382/209
(58) Field of Classification Search .................. 382/103, 382/115–118, 181, 190–223
See application file for complete search history.

(56) References Cited

U.S. PATENT DOCUMENTS

| 5,905,807 | A | * | 5/1999 | Kado et al. | 382/118 |
|---|---|---|---|---|---|
| 5,930,391 | A | * | 7/1999 | Kinjo | 382/173 |
| 6,124,950 | A | * | 9/2000 | Honda | 358/474 |
| 6,697,503 | B2 | * | 2/2004 | Matsuo et al. | 382/118 |
| 6,792,135 | B1 | * | 9/2004 | Toyama | 382/118 |
| 6,804,391 | B1 | * | 10/2004 | Blake et al. | 382/159 |
| 6,999,606 | B1 | | 2/2006 | Frischholz | |
| 7,110,602 | B2 | * | 9/2006 | Krause | 382/199 |
| 7,123,754 | B2 | * | 10/2006 | Matsuo et al. | 382/118 |

FOREIGN PATENT DOCUMENTS

DE    198 47 261 A1    4/2000
(Continued)

OTHER PUBLICATIONS

"*Human and Machine Recognition of Faces: A Survey*", Proc.of the IEEE, vol. 83, No. 5, May 1995, S-712-714; (R.Chellappa,Ch.L. Wilson,S.Sirohey).

(Continued)

*Primary Examiner* — Jingge Wu
*Assistant Examiner* — Sean Motsinger
(74) *Attorney, Agent, or Firm* — Duane Morris LLP

(57) ABSTRACT

A physically demarcated body part is recognized and located using only a relatively small amount of computation, but with a sufficient degree of recognition accuracy. For this purpose a procedure is proposed for detecting physically demarcated body parts (face, hand, leg) of a person's image (5) if a body part (2) as depicted in front of a background (3). Borderlines (5d, 5e) in the image are only evaluated along line directions (5a', 4a', 4b', 5c') to determine, by comparing with model (30), whether the body part image corresponds to a type of body part given by the model. In addition, line directions (5d', 5e') inside a body part image and borderline directions (5a) of a physically demarcated body part are used to locate and store its position.

13 Claims, 12 Drawing Sheets

FOREIGN PATENT DOCUMENTS

DE          100 43 460 C2    1/2003

OTHER PUBLICATIONS

"Automatic Reconstruction of 3D Human Face from CT and color Phographs" IEICE Tans.Inf&Syst., vol. E82-D,No. 9. Sep. 1999,S1287-1293; (Haider, Kaneko.).

"On the Use of Level Curves in Image Analysis", Image Understanding, vol. 57,No. 2,1993, S185-203; (Rocklin/Donahue).

"Fast Face Location on Complex Backgrounds—Face recognition, From Theory to Applications" NATO ASI Serries, F; Computer and Systems Sciences, vol. 163, 1998, S568-577; (Maltroni Maio).

"Real-Time face Location on Gray-Scale Static Images" Pattern-Recognization, vol. 3- 3,2000; (Maltoni Maio).

Manfred H. Hueckel: "An Operator Which Locates Edges in Digitized Pictures" Jounal of the Association for Computing Machinery, Jan. 1971, pp. 113-125, vol. 18, No. 1.

Peter Seitz et al.: "The Digital Doorkeeper—Automatic Face Recognition with the Computer", Proceedings of the Annual International Carnahan Conference on Security Technology, Taipei, Oct. 1-3, 1991, pp. 77-83.

\* cited by examiner

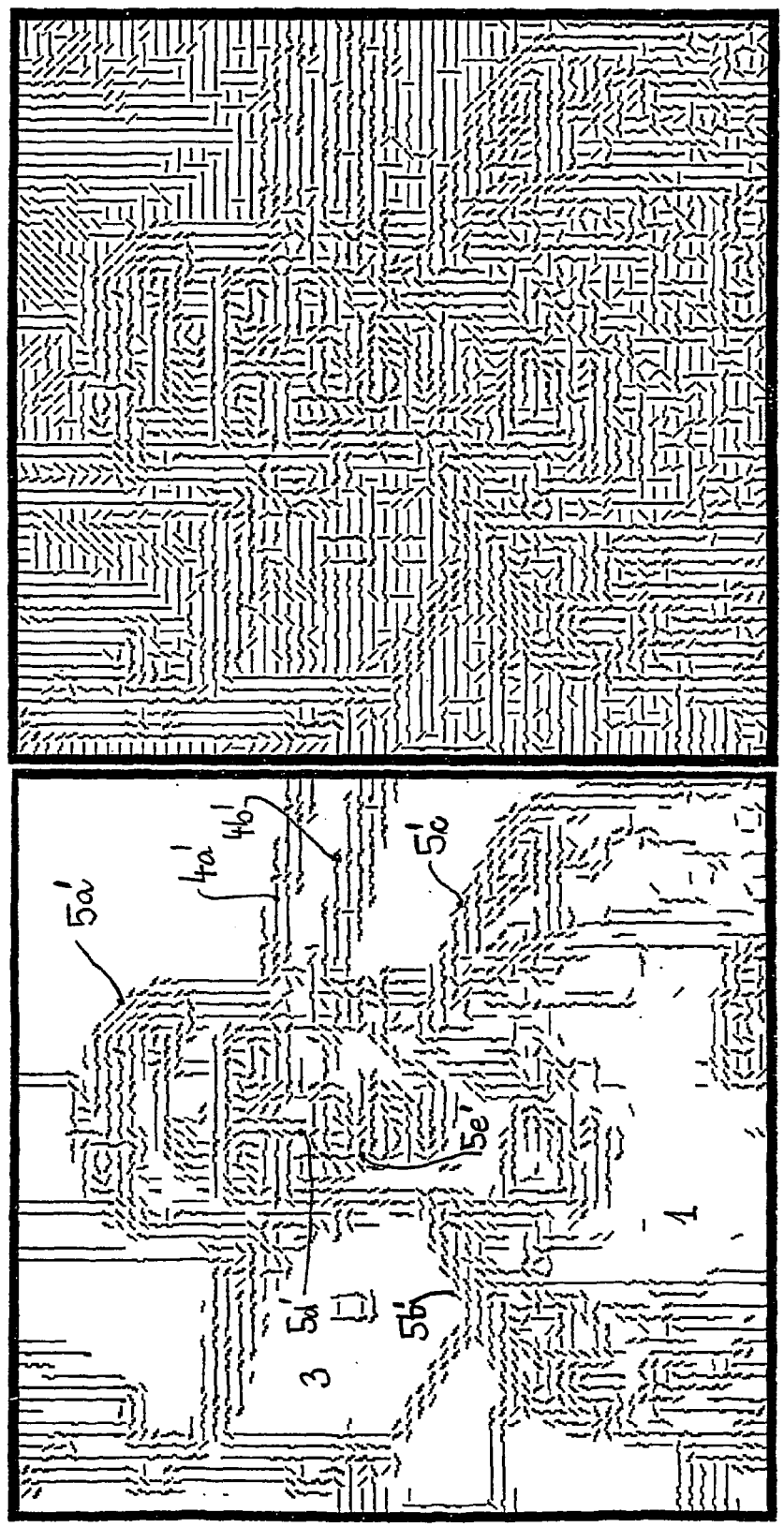

EVALUATION OF EDGE DIRECTION INFORMATION

BACKGROUND

This invention is concerned with the recognition of types of physical body parts like faces, hands, legs or any other body parts. These body part types have to be detected in static or moving pictures irrespective of whether it is known that the required part is present or not. When such a body part is detected, its exact position (its coordinates) should be indicated in the image and its size in terms of the measuring system used should also be made available. The procedure must be automatic.

In recent years the techniques for face recognition have been based on the typical gray scale intensity of face images. This detection procedure as applied to static or moving images is based on a gray scale picture, but if this term is used below, its meaning may include other intensities like color pictures or extracts from color pictures, as well as any other type of pictorial information which involves intensity variations. If the term "gray scale value" is used below, it should be understood in this general sense.

One type of recognition procedure endeavors to detect facial features like eyes, nose or mouth independently and then determine their position. The individual localities are subsequently used to find the actual face in the image according to specified rules or on the basis of statistical models.

The evaluation of information about edge directions and edge clarity has been proposed in the technical literature, see the article by Donahue/Rokhlin on information about edge directions: "On the use of level curves in image analysis", Image Understanding, Vol. 57 Nr 2, 1993, pages 185 to 203, especially Paragraphs 2 and 3 dealing with tangent vector calculation, and FIG. 2 in which the vector representation is illustrated. Elsewhere an operator is proposed which would be able to establish edges in digital images, compare Hueckel: "An operator which locates edges in digital pictures", J. Assoc. Comput., March 1971, Vol. 18, pages 113 to 125. For the purpose of face recognition edge information (also described as information about borderlines) of Maio/Maltoni has been employed, see "Fast face location in complex backgrounds", Face recognition, from theory to applications, NATO ASI Series F: Computer and Systems Sciences, Vol. 163, 1998, pages 568 to 577, as well as a later publication of the same authors in Pattern Recognition, Vol. 33, 2000, pages 1525 to 1539: "Real-time face location on gray-scale static images".

In later publications gray scale images are shown in the respective FIG. 2 which have been converted to edge direction images in terms of vector lengths and consistency, called direction reliability. In those cases the vector direction represents the tangent to the edge of the image, and the length of the vector, called significance, comprises the sum of the contrast values in the sense of edge thickness or edge clarity. In addition, "consistency" is used and explained as direction reliability.

The evaluation of numerous pieces of information about direction, reliability, and clarity is complex, and requires a great deal of computing power. Even modern computers cannot provide sufficient computing power, and small computers cannot be used.

SUMMARY

For this reason the problem has been reformulated to restrict research to physically separate body parts like faces, which requires decreased computing power but still provides sufficient accuracy of recognition. This is the subject of the methods and apparatus that are disclosed herein and defined in the claims.

The research is based on evaluating only relevant information instead of all given information. Only decisive direction information which can be derived from the borderlines of an intensity image, e.g. a monochrome image or a color extract. The borderlines are often also called "edges" as if they originated from actual edges in a two-dimensional image. This edge or line has both a direction and a thickness (clarity). In the present state of technology the methods mentioned above can calculate such information from monochrome (gray) images. Edge directions are decisive, but edge clarity is ignored in comparison to a model image. The model image established artificially, represents the type of body part found in a monochrome image and located by means of positional information.

The difference between detecting and locating can be seen in the fact that additional previous information is available in the latter case, namely that at least one searched for body part is present in the image. Then positional information is made available as well as the location in the image (determined from brightness values). This is used in the next stage as target image for finding the body part. For the purpose of defining the sought-for body part in the target image, the procedure can also provide information about its size.

If such previous information about the presence of, for example a face, is not available, then the procedure can determine additionally, by means of a threshold value, whether there really is such a sought-for face in the target image. In addition, the previously determined information about position and size can be made available.

The proposed procedure makes fast detection possible and achieves a high degree of certainty of recognition by using only a little model information and information derived from the edge direction image.

Line directions inside one body part image are used, as well as the line directions of a physically demarcated body part. The model evaluates the edge direction and also the actual edge of the sought-for body part and the edge directions inside this border. Other edge directions also present in the target image are allocated a low similarity index compared to the model. The result of all this is that positional information of the target image can be determined by comparing the agreement index of the edge direction information in the target image with the edge direction information of the model.

If size information is required in addition to positional information, then the relative sizes of the model and the target image can be changed. Furthermore, the target image is compared with the entire first size of the model. Subsequently the size of either the model or the target image is changed, followed by another complete comparison run. Several such runs provide a number of sets of agreement indices for each pair of relative sizes of target and model. Agreement indices with the best similarity indicate the size of the relevant body part sought for in the target image.

If the size of the model is increased stepwise for example, then the best agreement will be found when this size is essentially the same as that of the sought-for body part which had to be defined according to its size.

The known procedures for determining edge information by applying, for example, the Sobel operator to every pixel of the image, provide information about both direction and clarity (a pixel can either be the smallest area of an image, or several pixels grouped together). Clarity information is often also called edge thickness. If edge thickness is used for comparison with a threshold value, then only values which exceed some specified minimum, are retained as direction information in the image.

Information is rejected for those positions where the direction is not reliably recognizable and which should be regarded as noise.

Directional information is only evaluated for positions of the target image where the clarity is great. In this procedure only information which provides the greatest recognition expectation, is retained for comparison with the model which also possesses edge direction information.

If clarity information is set at a standard value, then the weight of the remaining directional information is too low for comparison with the model. Then comparison of the remaining working image with the model is reduced to comparing directions only; this results in fast processing and a more certain recognition in spite of the reduced information content.

The model has been mentioned repeatedly; it consists, for example, of a large volume of directional information obtained from test samples. However, the model may simply be a single image used because of its edge directions as described above, but then those sections of the image where there is directional noise, are filtered out. The use of a single test image as a model is justified if the user of the body part which is implied in the model, like a face, a hand, or a foot, is processed as disclosed and claimed.

The comparison between the model with directional information and the remaining directional information in the target image is done by means of a similarity analysis which can be an angular comparison of a directional orientation.

An angular comparison can consist of the sum of angle differences calculated for every point of the model according to its size or for every pixel of the image and then placed at one position of the target image for the entire area of the model. If the agreement is close, then the angle difference for each pixel comparison is small, even zero. The sum of small angles is also small. The best agreement is found where the sum is a minimum for the entire target image and for various relative positions of model and target image.

It would also be possible to use trigonometric functions of angles or angle differences together with angle differences themselves.

If there is no a priori (advance) knowledge of whether the sought-for type of body part is present or not, then a suitable threshold having a relatively low minimum is prepared. Only when a similarity is found which lies below this minimum threshold value, can it be deduced that the sought-for type of body part is represented in the image. This threshold value must not be zero nor maximal, otherwise the procedure would only determine the minimum of all similarity values distributed over the target image. This value must not forcibly agree with the position of a sought-for body part, but it only reflects a value which could even be extremely large.

If it is known beforehand that a sought-for body part is present, then it is not necessary to perform a threshold comparison, since the minimum of the similarity values obtained by comparing various size relationships, then automatically indicates the position of the sought-for body part.

When positional data is stored (mostly electronically), then evaluation results in a set of repeated comparisons with the model image where each comparison indicates a different local assignment of the model image and the borderline information of the target image. An example of a different local allocation is a pixel-by-pixel sideways emplacement over the target image. When a borderline of the model image reaches the edge of the target image, the scan is lowered by one pixel and again compared with the entire row of pixels. These repeated comparisons result in a set of similarity values for each position of the model image. The best similarity in this range can reveal the position where the model image most closely agrees with the target image.

If, in addition, various size relationships are employed, it would result in further sets of similarity values. And if the similarity indices are compared vertically, it means that the sets of similarity values can also be compared to reliably determine the position and the size of the demarcated body part.

The sum of similarity data, for example the comparison of angles at every pixel, produces a similarity value which represents a local allocation. It also represents a size allocation in terms of a size relationship.

Similarity data follow from angle comparisons using simple angle differences, or trigonometric functions of angle differences or of actual angles and adjoining difference determinations.

If reduced directional information is employed, it means that angle information does not exist for all positions in the model, neither does directional information exist for all positions in the reduced target image. Only when angle information for the relevant pixel position is available in both images, can it contribute to a similarity value in the sense of the value of similarity data. This follows from the consideration that where noise is present and angle information is blocked out because of a low level of reliability, there cannot really be similarity in regard to the sought-for object.

In addition, reduction of directional information can work with a binary operator applied after comparison with the threshold value. This provides an image pattern which has only two states for combined pixels, namely the maximum value or the minimum value. An image representation with gray steps between 0 and 255 agrees with both the mentioned edge values. This pattern image is suitable for multiplication with the directional information contained in an intermediate image of equal size to produce the working image. All directional data for which the clarity index lies above the threshold value, are retained, but all data which lie below the threshold, are deleted.

It is not necessary to add all the similarity data for a relative position of the model and the intermediate image to obtain a similarity value as a sum. But it is sufficient to use the best agreement, i.e. only a limited number of terms. If, for example, there are 120 possible values, only the 80 smallest ones (with the best corresponding similarity data) are required for the summation.

Further simplification is obtained when only acute angles are considered. This requires the conversion of angles larger than 90° to acute angles smaller than 90°. This is done in such a way that borderlines which make an angle of 90°, produce the smallest agreement. Between 90° and 180° the agreement improves, but from 0° to 90° the similarity is worse.

The model can be used as a model image and operate with directional information having angles between 0° and 90°.

BRIEF DESCRIPTION OF THE DRAWINGS

Some examples illustrate and amplify the procedure. Furthermore, the procedure is explained and extended by means of embodiments, but it should be pointed out that specially selected examples are described below.

FIG. 2e is an edge direction image (borderline directional image) which contains all the information of the initial image in FIG. 2a.

FIG. 4 and FIG. 5 correspond to contrasting representations of FIGS. 2e and 3, where a similar view having dark directional arrows has been selected.

DETAILED DESCRIPTION

Figure 1:
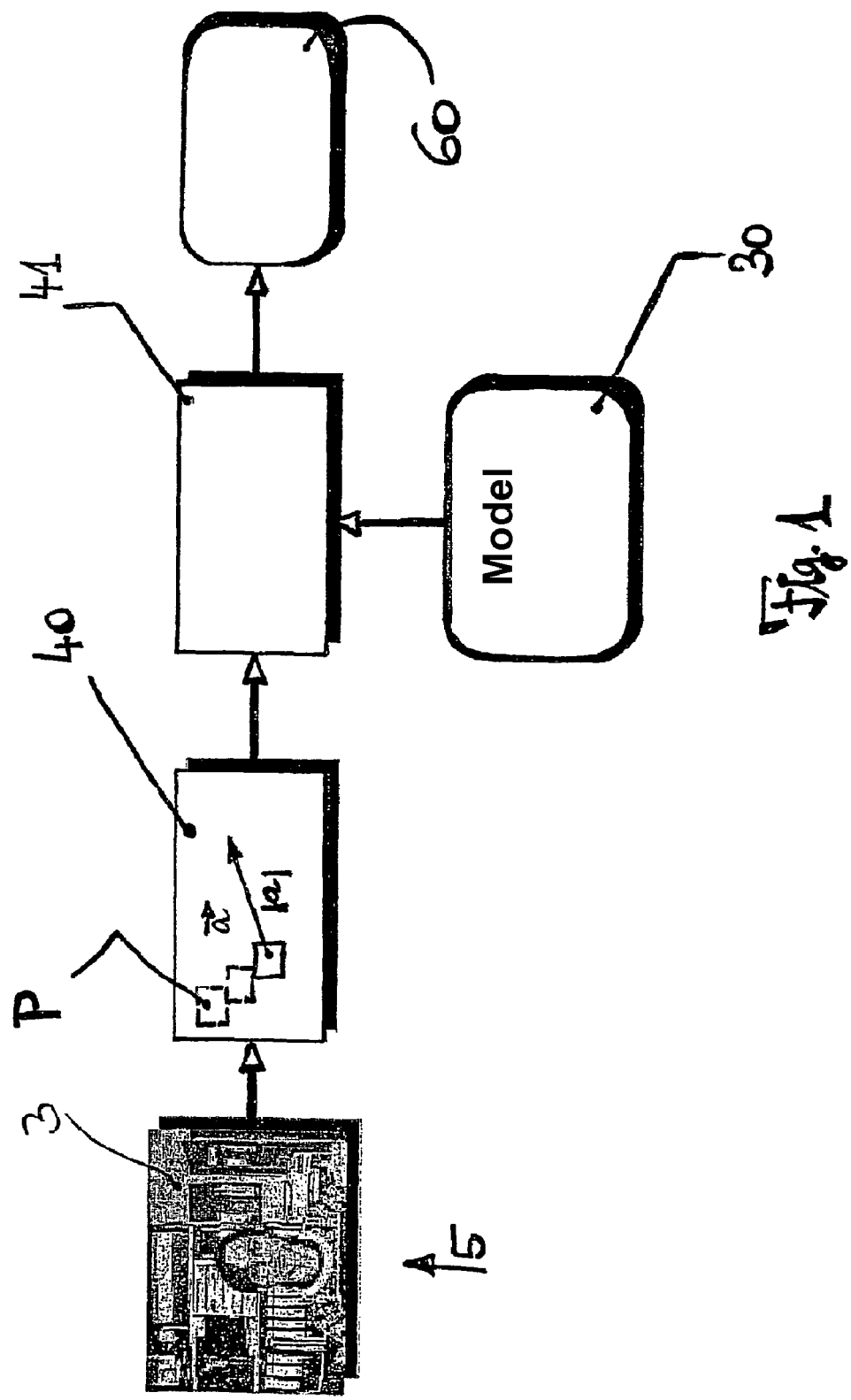
FIG. 1 is a block switched image of a first example of the procedure aimed at the recognition of a face in a grayscale image 5.

FIG. 1 is based on a grayscale image 5 as an example of an intensity image. It shows a face in a head and shoulders representation before a background. The grayscale image has been used as input to the first step of the procedure. This step 40 evaluates the image in many small areas and derives edge information. The partial image areas are either single pixels or groups of pixels comprising a small section of the image. For each of these partial areas, especially for each pixel of the grayscale image, directional edge information is given as well as thickness information. This can be represented as a vector which has both direction and magnitude (length).

The single pixels are symbolically indicated with a P in procedure step 40.

The resulting edge-orientated image is compared with model 30 in the next procedure step 41. This is done by shifting a smaller model over the image. A similarity index is calculated for each position of the model on the edge direction image. The model is subsequently moved one pixel to the right and a new similarity index is computed. All similarity indices cover the entire area of the edge direction image and thus also the grayscale image (minus the height and breadth of the model). The result is that a similarity index is available for every position of the model in the grayscale image in step 41 which gives the agreement of the model with the edge direction image at that locality. By using these similarity indices obtained in step 41, procedure 60 determines the area where the agreement is greatest. This area then indicates the position in the grayscale image of the sought-for body part, a face, for example.

Figure 2:
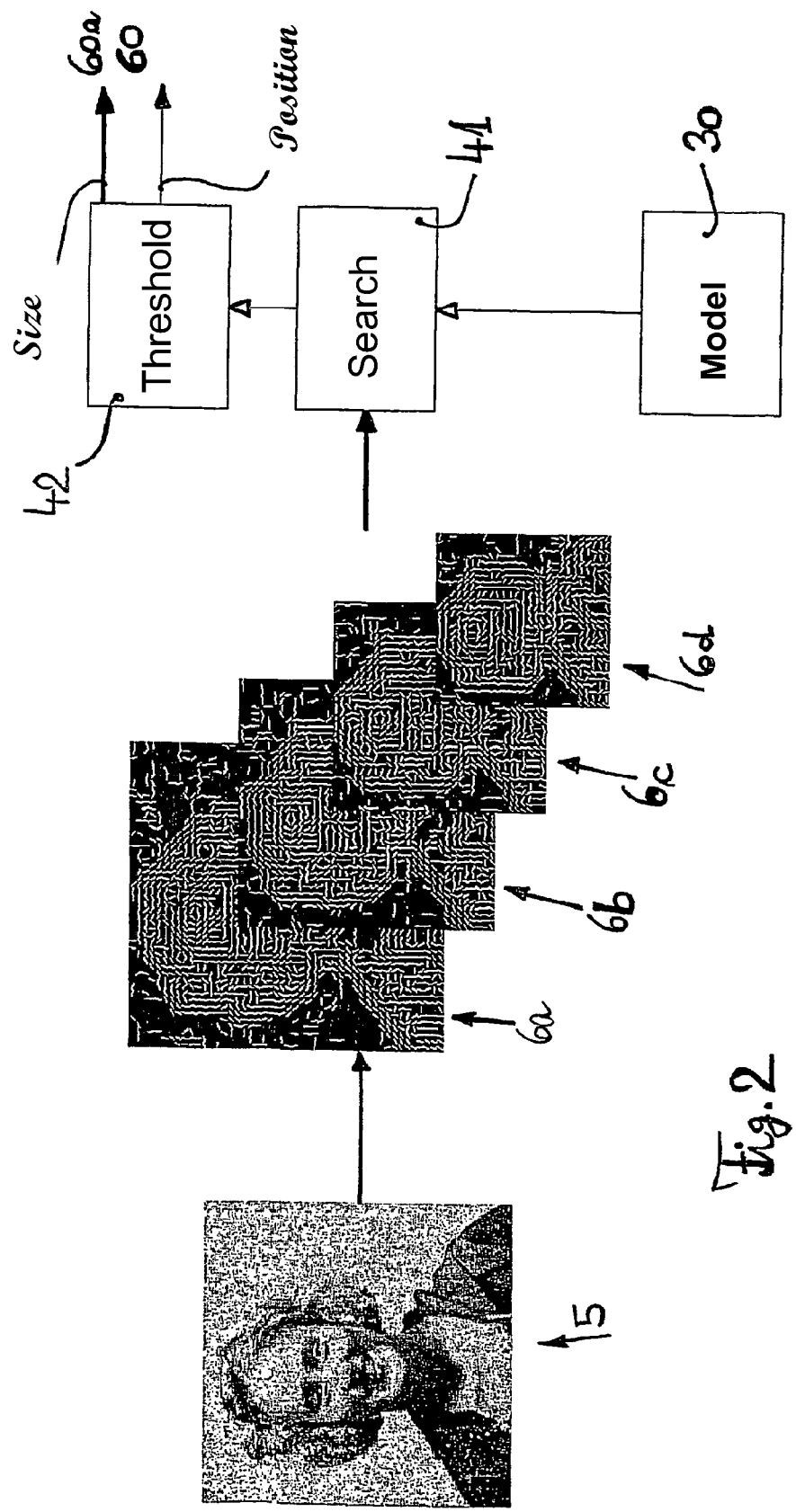
FIG. 2 is an alternative execution example also directed at the recognition of a face where additional size information is provided.

Another example of the procedure is FIG. 2 which is a modified version of FIG. 1. Size information is provided in addition to the positional information of step 60. Function block 41 corresponds to step 41 of FIG. 1, and model 30 corresponds to model 30 of FIG. 1. Grayscale image 5 corresponds to image 5 of FIG. 1. This grayscale image is also converted from FIG. 1 to an edge direction image according to step 40. This latter image is subsequently passed on to step 41 which makes the required area comparisons with the model.

After each comparison the enlarged or reduced edge direction image is again subjected to a procedure for determining similarity indices as described above in step 41.

From the four sizes of the edge direction image, 6a, 6b, 6c, and 6d, four sets of similarity indices are derived, each of which includes the entire image. In this case the size of the model has not been changed. As a further procedure example—not shown—FIG. 2 can also be processed in such a way that the size of the edge direction image remains unchanged, but the size of the model is increased or decreased stepwise for each iteration of procedure step 41. In this way further sets of similarity indices are obtained which can be used by step 42, position 60, as well as size 60a for determining the sought-for body part.

In addition, a threshold value is used if it is uncertain whether the tested target image 5 actually does contain the sought-for body part, a face in this case. Model 30 is an edge direction model of the type "face", and it is only suitable for comparing faces as edge direction model with faces as edge direction image, developed from the grayscale image 5. The provision of a threshold value in step 42 ensures that the detection process is meaningful even without foreknowledge about the presence of a face. If a threshold value is not supplied, then, in the case of a procedure without foreknowledge, it would not be possible to decide whether a maximum value found amongst the similarity indices is a meaningful agreement factor or not. However, in step 42 a threshold value is not required when foreknowledge is available and the determination and reporting of the position and size of the expected face is the actual purpose.

Figure 2A:
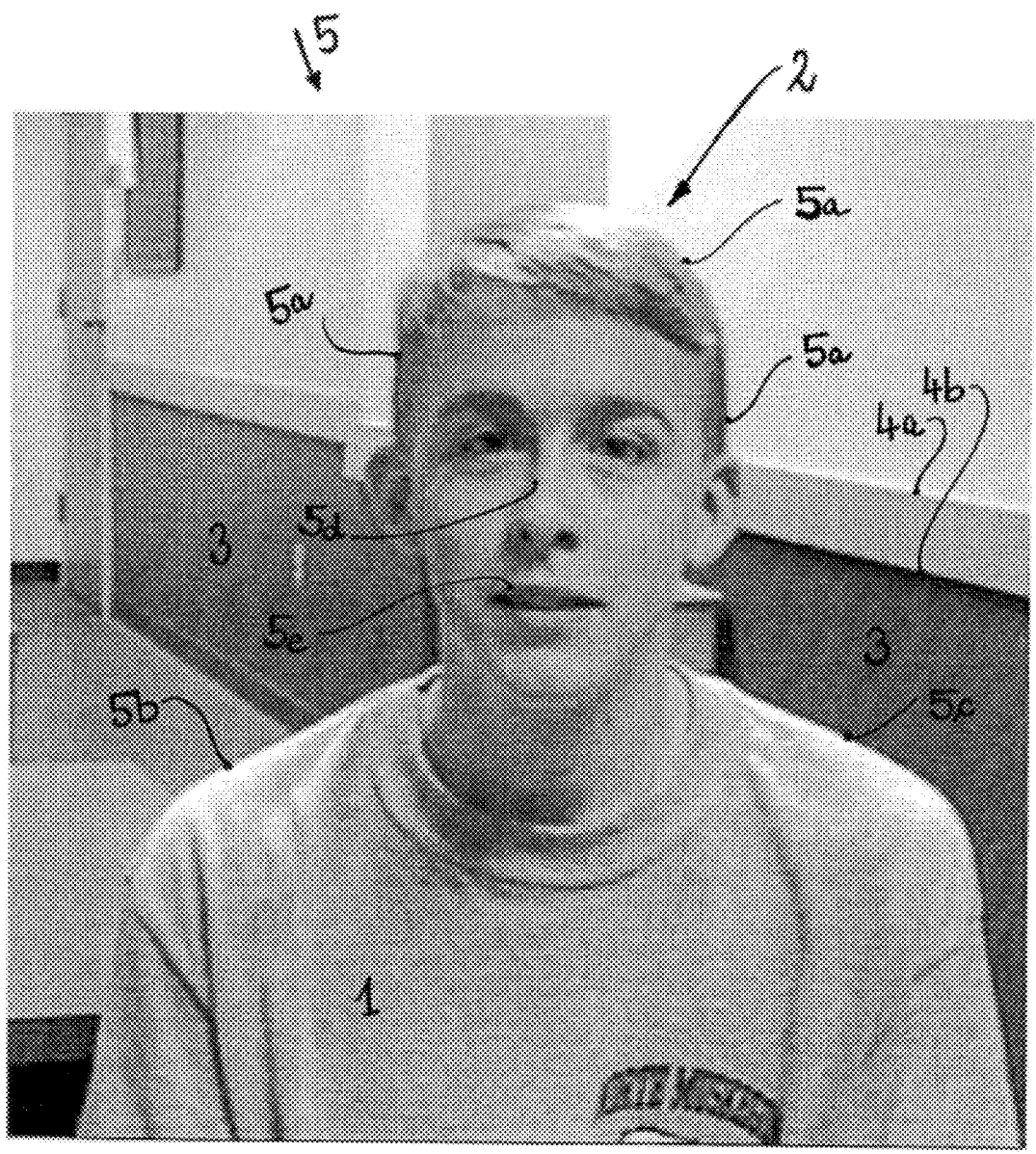
FIGS. 2a up to 2e are representations of different steps in the processing of the grayscale image of FIG. 2a. Also.

The operation of the procedure according to FIGS. 1 and 2 should be clear from the sequence of FIGS. 2a to 2e. The single procedure steps are reflected like the initial image 5 which is represented in FIG. 2a as a grayscale image with intensity variation subjected to a corresponding influence of the above-mentioned calculations. In FIG. 2a several sections of the image which appear in the later images, are drawn in and numbered similarly for comparison purposes.

Some of these image sections in the grayscale image are now explained. In general the background is indicated as 3; it consists of a sloping wall. There are two prominent lines 4a and 4b, which run diagonally backwards behind the face image. The face is generally indicated with 2. The face and the shoulder section shown, exhibit inner "edges" in the sense of linear structures, indicated by 5d and 5e inside the face. Both shoulder areas which contrast strongly with the background 3, are indicated by 5b and 5c. The general borderline of the face is 5a which includes both edge or demarcation lines represented as two-dimensional imaged edges 5e and 5d.

Figure 2B:

FIG. 2b originates in procedure step 40; it is the preliminary step in forming the edge direction information in the grayscale image for evaluation by means of model 30. At this stage the grayscale image has been changed by an operator which increases the contrasts. The Sobel operator, for example, is used for this purpose; it is able to provide the edge thickness and the edge direction for every pixel of the image. Because of the large magnification every pixel can be seen in FIG. 2b, located in a generated grid. The shoulder edges 5c and 5b are especially clear in this intermediate image of FIG. 2b. The borderline 5a of the face is also obvious as well as borderlines 5d and 5e lying inside the face. Background (3) lines 4a and 4b are also clearly visible as edges. Area 1 of the image contains little edge information because there are hardly any edges. Having little information to be evaluated, this area must be regarded as noise.

The processing step for obtaining FIG. 2b determines the described explanations of the edges by comparing pixel contrasts. The Sobel operator can be regarded as a linear filter which operates like a high-pass on a flat plane. The grid shown, corresponds to the pixels. The linear clarity of the edges increases with the difference in intensity, for example edges 5c and 5b compared with background 3.

The actual vector representation of the image as stored in the computer, is not illustrated. It can however be represented immediately by means of FIG. 2b. A vector having direction and length is assigned to each pixel. These vectors can be stored in a set of Cartesian coordinates, or in polar coordinates, using magnitude and angle. Every pixel $P_{xy}$ in the x . . . y plane of the image thus carries the orientation and length of such a vector. This implies that every pixel has a measure for the edge direction and a measure for the edge clarity.

Figure 2C:

In a further image, FIG. 2c, all information which cannot contribute to meaningful evaluation processing, is blanked out. In addition, a threshold value is used for comparison with each pixel in regard to edge clarity. If the edge clarity of a pixel exceeds the threshold value, it is retained together with the direction information of this pixel in the image of FIG. 2c. Areas like section 1 or the dark part of the background 3 below line 4b down to the very conspicuous edge 5c, are blanked out or provided with a black value, namely zero. For a gray value scale running from 0 to 255, the latter indicates a prominent edge and a bright value, while the value 0 is not processed. Apart from the comparison with the threshold value, every pixel with a larger clarity index, also has an analogue value of between 0 and 255.

Figure 2D:

In FIG. 2d these analogue values have been deleted and the image is now digitized (in binary) as intended in step 40 of FIG. 1. All analogue information has now been eliminated and pixels are evaluated with relation to the threshold value—whether it is exceeded or not. Edge clarities lying above the threshold value, are evaluated as level 255 (pertaining to one pixel). Values below or equal to the threshold value are evaluated as zero. The image in FIG. 2d can be regarded as a digitized edge image.

This is a result of using threshold value imaging. A direct transition from FIG. 2b to FIG. 2d is possible if image 5 is processed pixel-by-pixel in step 40 in terms of comparison of threshold values and digitizing. Digitizing causes a maximization of contrasts for further processing leading up to FIG. 2d.

Figure 2E:
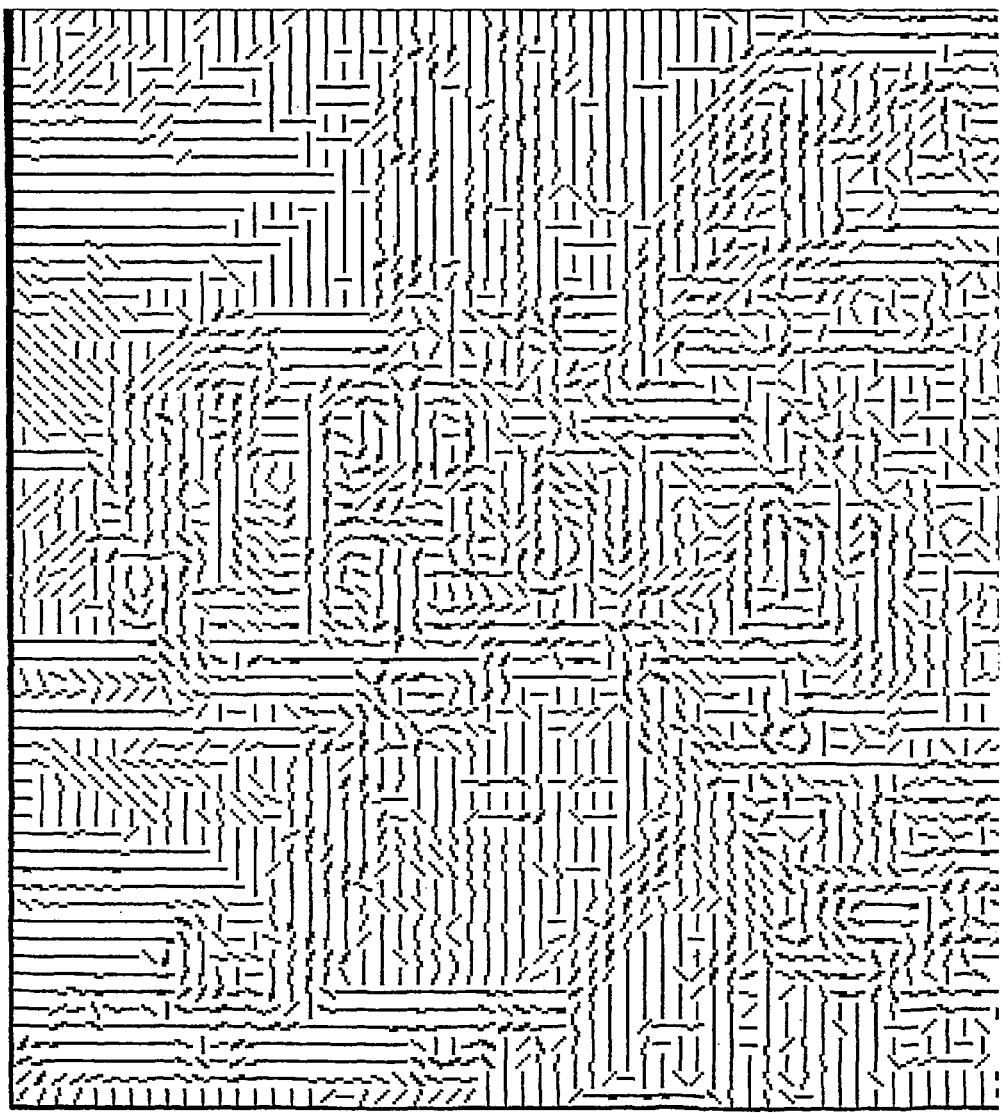

Edge direction information is obvious in FIG. 2e, being represented by short line segments. The direction of the line segments correspond to a polar coordinate representation in terms of direction. When closely scrutinized, one can see that the directional information in the face and shoulders correspond to the lines drawn in FIG. 2a. Lines 5c and 5b are clearly recognizable. The same holds for the inner lines 5e and 5d. Even line 5a, being the boundary of the face, is recognizable. Diagonal lines 4a and 4b are not so clear, but this is a representation problem of the coarse grid used for pixel 6. However, vertical and horizontal lines are especially clear.

Figure 3:
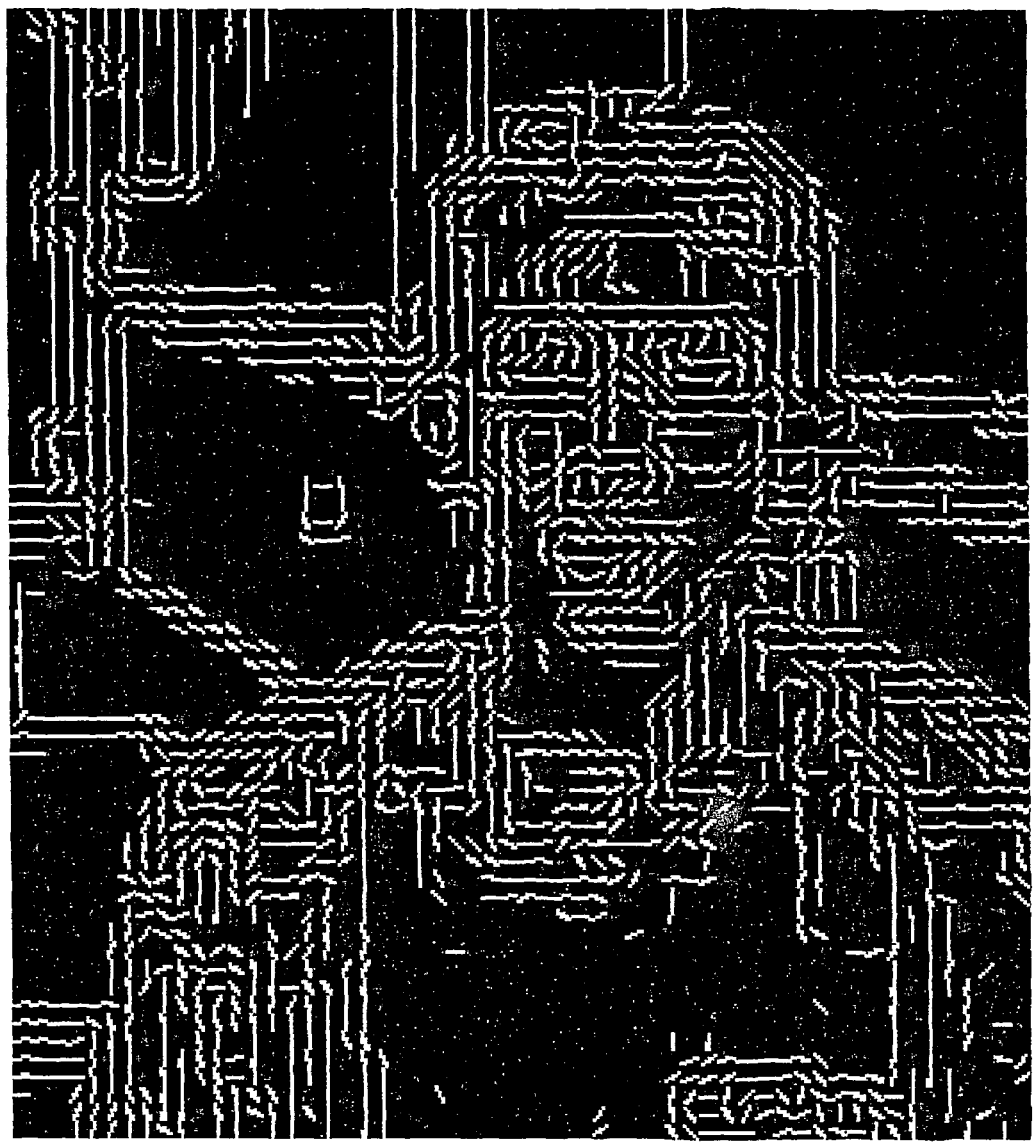
FIG. 3 is an edge direction image for which only part of the information of FIG. 2e is available. What is more, this representation is inverted with white directions on a dark background.

FIG. 3 is the result of processing an image with reduced information content. Only those areas of FIG. 2e which entail essential edge information, are included. The blanking out of unessential areas is effected by coalescing the images of FIGS. 2d and 2e. Those areas which have been made black because of being below the threshold value, are also black in FIG. 3. The information content, including the edge clarity and the edge direction, have been extracted from FIG. 2e—only the directional information associated with pixels having a clarity index above the threshold value.

The threshold value can be selected freely, depending on the type of image or the available contrasts. It can also fall away entirely if the image as such exhibits little noise.

FIGS. 4 and 5 are direct opposites of FIGS. 3 and 2e. FIG. 3 is the inverse of FIG. 4, while FIG. 5 corresponds directly with FIG. 2e.

In FIG. 4 the total clarity information is neutralized, meaning, for example, that all vectors are of equal length. Only the directional information is retained. In the polar coordinate representation all pixels in the image possess a vector of equal length according to FIG. 4, but a directional vector corresponding to the edge direction at the locality of the pixel. Since the magnitude of the vector is omitted from further evaluation, it can also be put equal to zero, retaining only the direction for every pixel. The length of the directional vectors are given a standard size of 6 pixels.

The moment for standardization is determined by the actual version of the evaluation program, since it cannot take place during the preliminary steps when the clarity information is still being processed. It implies that FIG. 2e can be obtained directly from FIG. 2a by using the Sobel operator mentioned above. FIG. 2e can also be obtained along a parallel route via FIGS. 2b, 2c, and 2d. In this case the size of the vector can immediately be set to a standard value, six in this case, as drawn in the figure. These pixels can be recognized by the diagonal vector lines.

Evaluation of the now reduced information follows from FIG. 4 (or FIG. 3). The information is reduced for areas of high clarity where only directional information is retained. Theoretically additional information can also be stored, but such information is not evaluated in the next steps.

Figure 8:
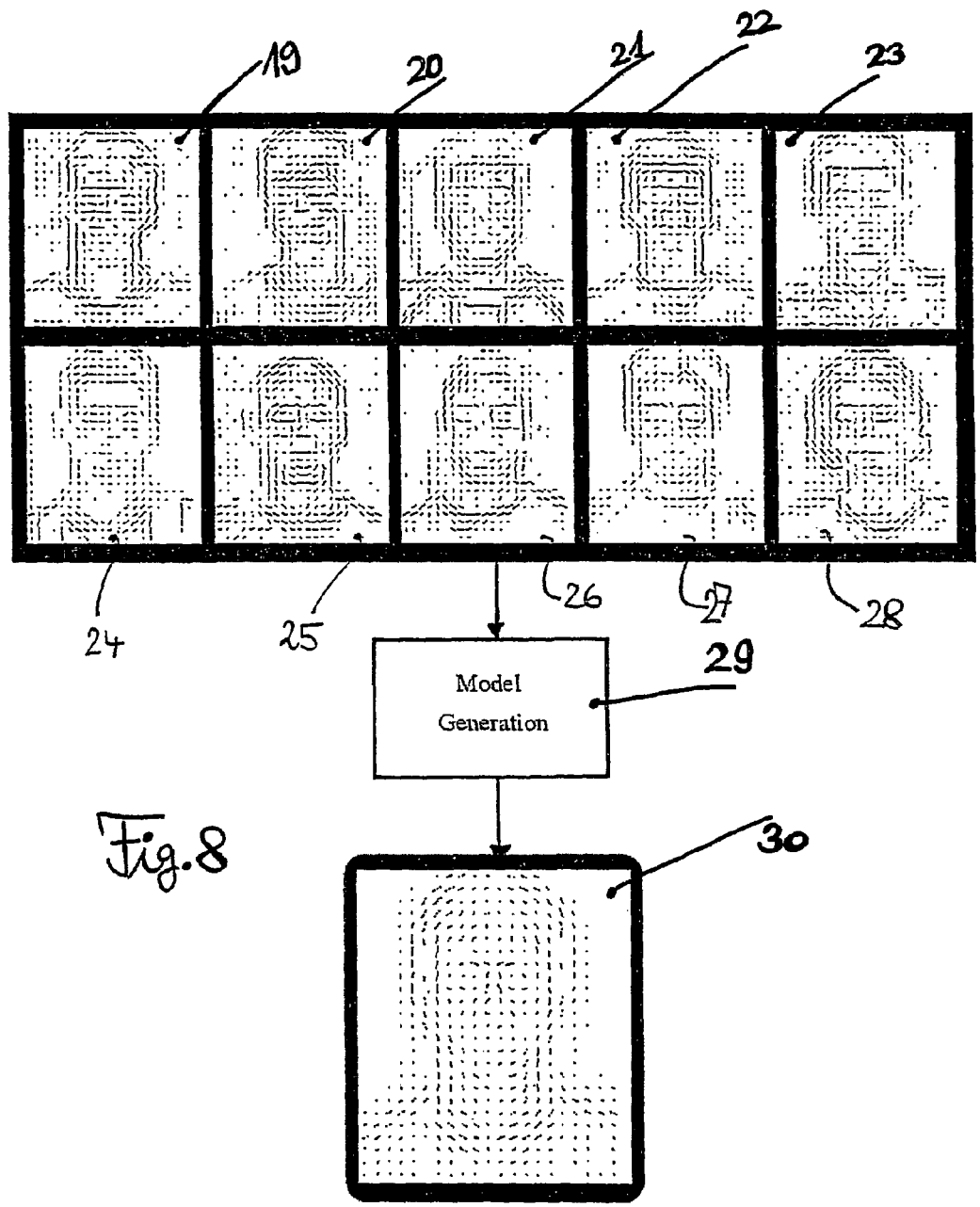
FIG. 8 is an example of a model generated from the ten images of a sample. Model 30 contains selected edge direction information.

Then comparison with model 30, the model image, follows. At first it is assumed that a model which contains directional information, does exist and represents a certain type of body part sought for in the edge direction image with reduced information, namely FIG. 4. An example of such a model appears in FIG. 8. The model 30 image drawn there contains directional information which has been reduced in a similar way. The origin of the model is explained below.

In procedure step 41 of FIG. 1 model 30 is compared with the image obtained for FIG. 4. It should be assumed that the model is smaller than the image. The model may, for example, comprise only the area of the head, while FIG. 4 contains other sections as well. The model is placed in the upper left corner of FIG. 4 and compared pixel-by-pixel with the reduced edges image. Then only directional information is compared.

The comparison can be structured in such a way that angle differences are compared for every pixel position. A difference matrix can be constructed by summing the angle differences for all pixels. The maximum number of terms in this angle difference sum is equal to the total number of pixels in the model. This sum is stored at a position representing the upper left corner of the image. Subsequently the model is shifted one pixel to the right and an angle difference sum is again determined for the entire model. This similarity index is stored next to the previous pixel. This step is repeated until the model has covered all pixel positions in the target image of FIG. 4 and all similarity indices have been calculated and stored.

It is obvious that the similarity values indicate a good agreement when the angular differences are small. The sum of small angle differences is also small, meaning that the smallest index indicates the best agreement. This is the purpose of the evaluation procedure.

Consider an example. If a model measures 40 pixels vertically and 30 horizontally and a target image with reduced information content measures 120 by 120 pixels, it means that a total of 80×90 positions cover all pixels of the image resulting in 7200 similarity values.

Figure 6:
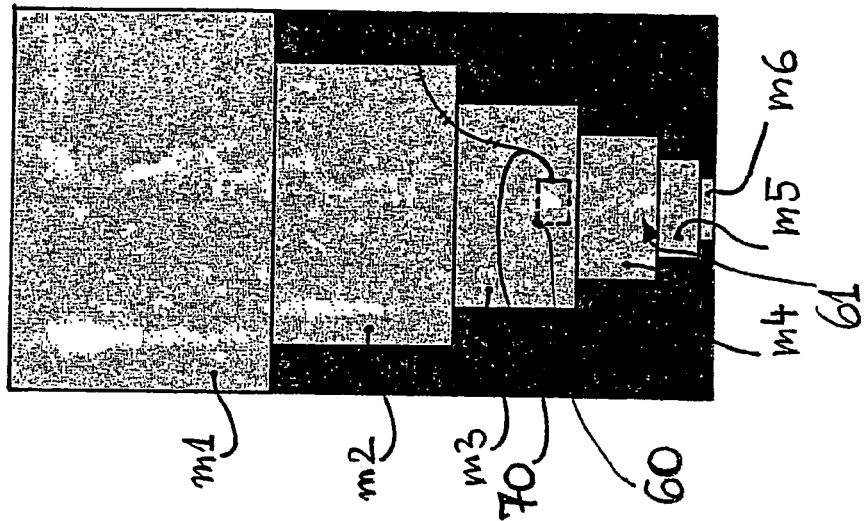
FIG. 6 is a representation of a similarity calculation for a grayscale image where different sizes of the model is employed for purposes of comparison.
Figure 6A:
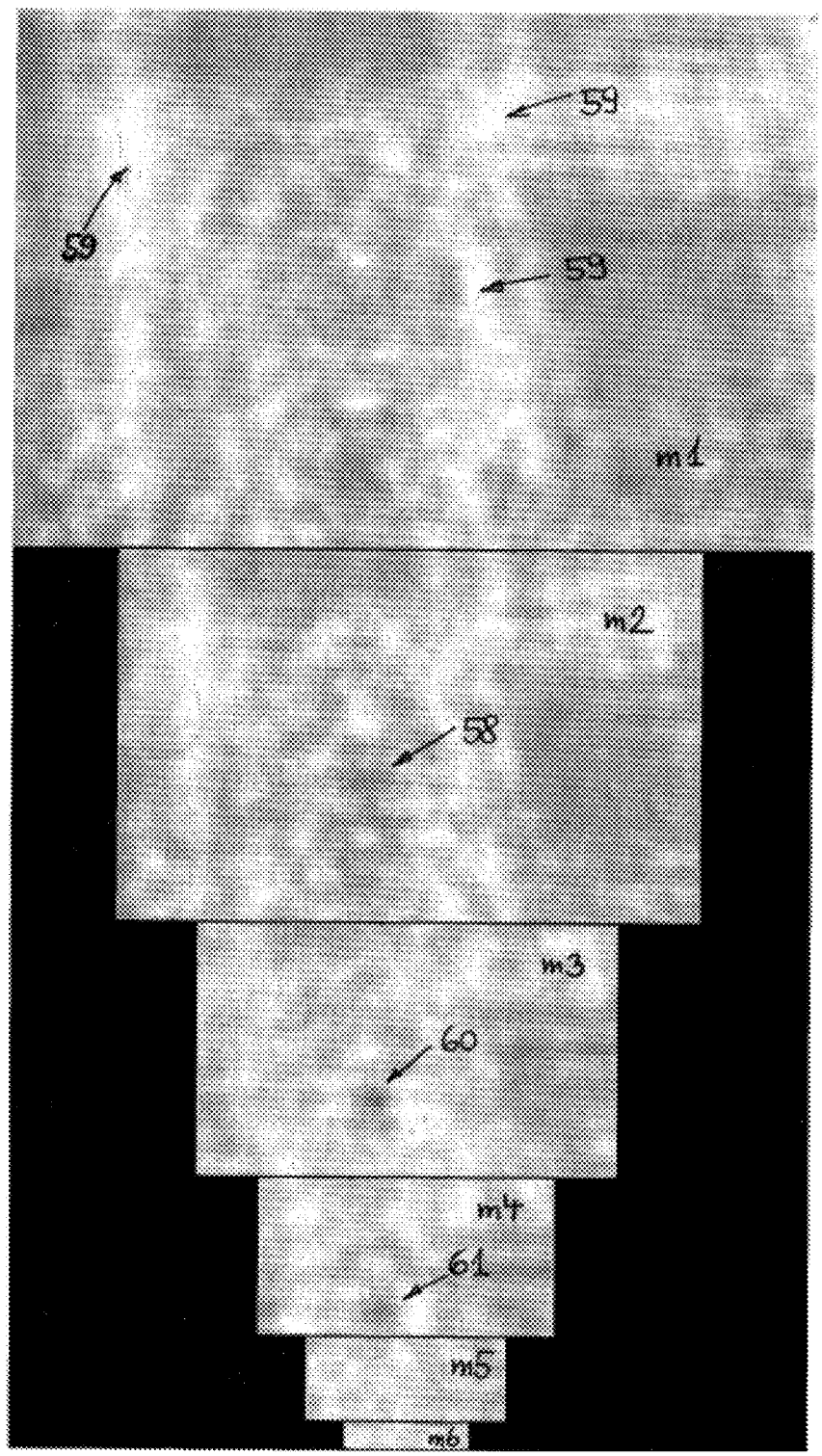
FIG. 6a is an enlarged representation of FIG. 6 where a brightness value is allocated to every pixel, symbolizing the degree of agreement of the model with a section of the image corresponding to the size of the model. Bright areas indicate low similarity, while dark areas represent great similarity.

A similarity index can be represented by a brightness value. A high brightness index of 255 indicates a low similarity, and a high similarity (a small sum of angle differences) corresponds to a low value close to zero, or a black point. FIGS. 6 and 6a are an example corresponding to the image from FIG. 7, processed according to FIGS. 2a up to 2e. Before discussing this processing, the calculation of angle differences is now explained.

It may happen that no overlapping can be determined when both model 30 and the target image (FIG. 4) possess a reduced information content and both compared pixels have no directional information, then the angle difference is set at a maximum to indicate a dissimilarity.

When angles and angle differences between 0° and 180° are accepted, then the maximum value is 180°. For a good agreement the angles of a pair of pixels being compared, are equal and the difference is zero. Instead of an angle difference a trigonometric function which is not multivalued between 0° and 180°, can be used. The function (1−cos a) gives a value of 0 for identical angles where a represents an angle difference, and when the angle difference is a maximum, a similarity index of 1 is obtained. When such a function is used instead of the plain angle differences, the summation is reduced to terms lying between 0 and 1.

A formula for the direction difference d (angular agreement) at a point is given under (1) below. When the result is naught (=0), the agreement between the directions is optimal for that pixel.

$$d = \sin(|f_m - f_p|) \quad (1)$$

where
$f_m$ = edge direction at a point of the model
$f_p$ = edge direction at a point in the edge oriented target image.

Instead of using angles in the range 0 to 180° only acute angles lying between 0° and 90° can be used. Then values between 90° and 180° are converted to acute angles by subtraction from 180° with the result that an angle of 91° corresponds to 89°, and 180° indicates a good agreement like 0°. Or the model as such can be set up in such a way that it only contains information about acute angles, then the comparison procedure is simplified, since sine and tangent formulas can be used in addition to cosine functions.

In the example described above, the sizes of the image and the model result in 7200 angle difference sums (similarity indices) forming a new matrix which is represented in FIG. 6 on an m1 plane. Plane m1 corresponds with the plane in the image of FIG. 7. This modified image is now evaluated for a minimum to determine the position of the model on the target image of FIG. 4 where the best agreement will be found. For this purpose all 7200 points have to be investigated to find a minimum. And for a minimum value to make sense, a threshold value is required if there is no previous knowledge about the presence of a sought-for face for example. It is also possible that several minima can be found if there are several faces in the target image. Positional information can be given based on the position of the pixel where a minimum is found. Depending on whether the agreement value occurs in the upper left corner of the image or elsewhere, a simple calculation can give the exact location of model 30 in the target image. This result is obtained either by specifying its center and size, or the positions of the corner points.

The range of summation of the single angle differences (or a trigonometrical conversion) can be decreased in the case of a reduced number of similarity data (angle differences) and if a respective similarity for a local allocation of model image and edge image according to FIG. 4 is used. For example, the best applicable values are found. The inferior values should not be used, since they might result in deterioration of the similarity value. It could thus happen that out of 120 available values, for example, only 80 are used. It is then possible to use only ⅔ of the available values for summation and for obtaining a similarity index using only the smallest values in the sense described above. Minimum values produce the best similarity indices. If a suitable inversion program is available, then everything can be inverted correspondingly.

It should be mentioned that this difference formation cannot be obtained by means of a scalar product nor by using polar coordinates, as shown above.

By selecting the model the type of body part to be sought for in the target image, can be determined.

If size information is given in addition to position information, then the model can be changed in size relative to the target image of FIG. 4. Alternatively, FIG. 4 can also be enlarged or reduced when the size of model 30 is not changed. The procedure described above is executed for every selected model size or for every selected target image size. For several iterations several images m1, m2, m3, m4, m5, m6, etc. are obtained according to FIG. 6, where each of these images represents one model size and an image of all similarity indices of the respective comparisons of the model with the target image. Model size can be changed in small steps, for example with a factor lying between 1.1 and 1.4, and preferably between 1.2 and 1.3 to avoid large jumps in similarity values.

Figure 7:
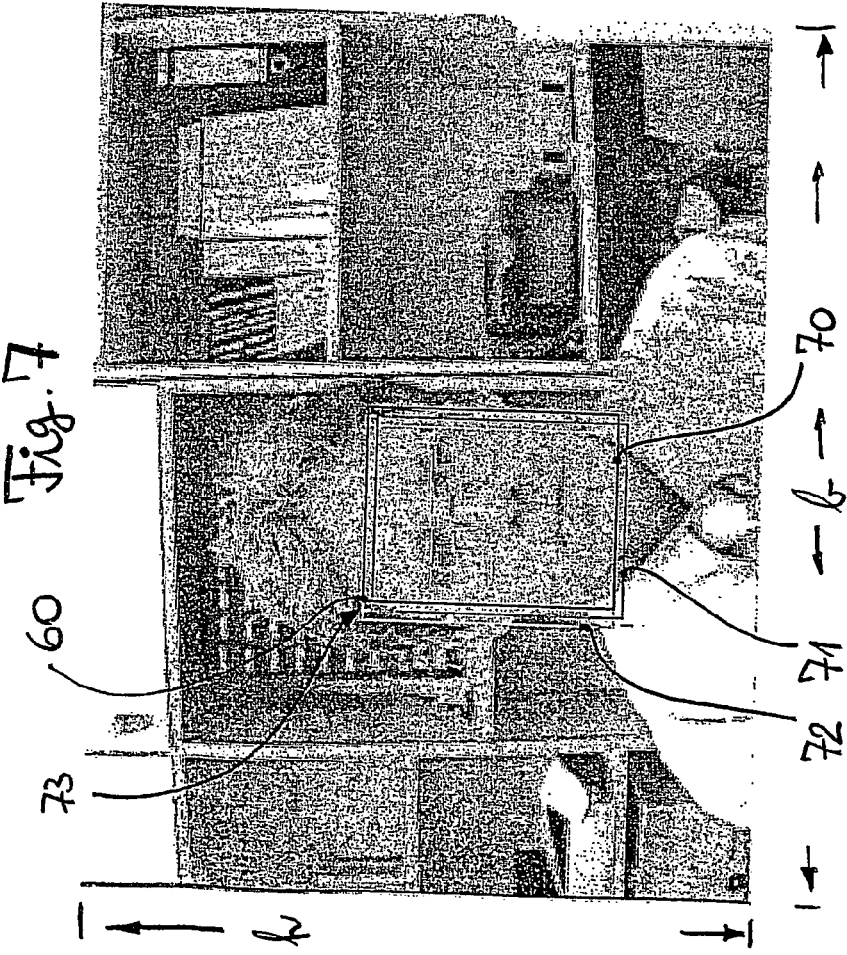
FIG. 7 is a grayscale image belonging to FIG. 6 where the sought-for body part has been found as the face in frame 60.

The initial image of FIG. 7 is firstly evaluated according to the procedure described above without the drawn-in frames 60, 73, 71, 72, and 70. The height of the grayscale image is h, and its breadth is b. A matrix of similarity indices has been determined for this image according to the procedures described above and as visualized in FIG. 6a for the first partial image m1. Several white positions are clearly discernible here, indicated with 59. In these image areas the least agreement has been found.

After establishing the first similarity image m1, an enlarged model is used, leading to matrix m2 which exhibits a dark spot in area 58. The grid in FIG. 6a reflects the relative positions for which similarity indices have been determined. Every pixel corresponds to a certain position of the model relative to the edge direction image according to FIG. 4, but in this case it is restricted to another representation of FIG. 7.

A further enlargement of the model results in matrix m3, where position 60 becomes even more obvious. In this case the best agreement is found where the smallest value of angle sums occurs and thus results in a dark spot with a value close to zero. In FIG. 6 this area is drawn in like frame 60 in FIG. 7, where the sought-for face is located. Further increases in the size of the model result in the sequence of matrices m4, m5, and m6. The stepwise black borders are explained because an increasing model has fewer resulting points when the size of the target image, b×h, stays the same. This is valid for both vertical and horizontal directions.

The frames drawn in FIG. 7 are different frames originating from several pixels close to the minimum value. Frame 60 characterizes both the position and the size of the facial part found, where the size is found from the model which produced the resulting matrix m3 and the position is given by the dark position 60 in this matrix.

Formation of the model was mentioned previously, but it was kept in reserve. It can in any case be obtained in the same way as the image of FIG. 4. For the formation of the model, the threshold mentioned there must not be zero. The data is digitized and only directional information for the model is stored. Then the model can be formed from a single image. But according to FIG. 8 the model can also be used in many images, 19 to 28, which comprise a sample. All these images form natural faces, used here as example of any desired body part.

Each of these images originated in this described procedure in a similar way as the image in FIG. 4. These images are combined in step 29 where the model is generated. It can be done by means of a middle value based on the angles encountered at the pixel positions involved. To enable comparison of these images, characteristic locations like eyes, nose and mouth should be given at similar positions in so far as the similarity of the size relationships of the images are given.

The range of applicability of the methods described covers the finding of faces as well as determining whether a face is at all present in the target image. Instead of a face, other body parts, like hands, legs, or entire persons, can also be located. This position can be found in the case of static images as well as moving images because computation is fast enough. In moving images an object can be identified in terms of its motions. In the case of motion of the sought-for object in a remote or a nearby direction, size information can also be supplied.

The invention claimed is:

1. A method for locating a face of a person pictorially represented in a target image containing at least one face to be located in front of a background, the method comprising the steps of:
    (a) providing an edge line model containing edge line information of a plurality of faces and storing model edge line directions for comparison;
    (b) converting the target image to an intermediate image having edge lines at least accentuated;
    (c) providing from said accentuated edge lines a binarized edge direction image of the target image, representing directions of said accentuated edge lines;
    (d) comparing directions in said binarized edge direction image with the stored model edge line directions at a plurality of pixel locations, by providing angle differences of directions at the pixel locations and wherein prior to providing the angle differences at the pixel locations the angles at said pixel locations are converted to acute angles between zero and 90 degrees instead of between zero and 180 degrees;
    (d1) and summing said angle differences to provide a first sum of angle differences,
    (d2) moving said edge line model and the binarized edge direction image in steps relative to each other and providing for each step a sum of angle differences at a plurality of pixel locations, wherein prior to providing the angle differences at the plurality of pixel locations for each step the angles at said pixel locations are converted to acute angles between zero and 90 degrees instead of between zero and 180 degrees;
    (d3) comparing the sums of angle differences of each step, and thereby locating the face to be located in the target image by computing positional information thereof and storing said positional information of said face to be located as a located face.

2. The method according to claim 1, wherein images of plural faces are present on said target image, and are consecutively located by comparing the directions of said edge lines in said edge direction image with edge directions of the edge model.

3. The method according to claim 1, wherein the positional information contains data about a position of a face to be located in the edge direction image and correspondingly in said target image.

4. The method according to claim 1, wherein the edge lines of the edge direction image and the edge model include first edge lines (5*d*, 5*e*; 5*d'*, 5*e'*) within the pictorially represented face to be located, and a second edge line (5*a*, 5*a'*) delimiting the face to be located from the background.

5. The method according to claim 1, wherein the target image comprises a scenic picture having different, but locally unchanging intensities and appearing as a static image in a digital format.

6. The method according to claim 1 wherein a boundary line in the target image comprises edge line information that is associated with orientation as direction.

7. The method according to claim 1 comprising accentuating edge lines from an evaluation of an intensity difference between two adjacent image areas to determine contrast.

8. The method according to claim 1 wherein the face to be located is represented in front of the background (3) in the target image and is made available for a binary comparison to determine correspondence between the target image and the edge model.

9. The method according to claim 1 wherein the target image comprises a grayscale image having at least one component in one of a visible light range and an invisible wavelength range.

10. The method according to claim 1 further comprising determining and storing size information in addition to the positional information.

11. The method according to claim 10 wherein the size information is determined by changing a relative size of the edge model and the target image and comparing the edge model and the target image for providing the size information.

12. The method according to claim 1 wherein a threshold value is compared to similarity values distributed over the target image, concluding that the face to be located is present in the target image if at least one index is below a minimum threshold value.

13. The method according to claim 1, wherein the binarized edge direction image is compared with the edge line model by calculating several sums of angle differences for all pixels contained in said edge line model.

* * * * *